UNITED STATES PATENT OFFICE.

OTIS A. MYGATT, OF PARIS, FRANCE, ASSIGNOR TO HOLOPHANE GLASS COMPANY, OF NEW YORK, N. Y., A CORPORATION OF NEW JERSEY.

ART OF GLASS MANUFACTURING.

1,155,000.  Specification of Letters Patent.  Patented Sept. 28, 1915.

No Drawing. Original application filed November 1, 1910, Serial No. 590,140. Divided and this application filed February 12, 1913. Serial No. 748,021.

*To all whom it may concern:*

Be it known that I, OTIS A. MYGATT, a citizen of the United States, residing in Paris, France, have invented certain new and useful Improvements in the Art of Glass Manufacturing, of which the following is a specification.

The present invention relates to the production of glass inclosures, such as globes, shades and reflectors for artificial lights and also of vases and the like, having on their surface or surfaces raised and depressed portions constituting designs embodying artistic blendings of different tints or colors. The process furnishes an economical method of producing by purely mechanical means color blending effects which have hitherto been approximated only by expensive artistic hand-work.

This application is a division of application Serial No. 590,140, filed November 1st, 1910.

The invention consists in forming the article of two or more layers of glass of different colors or of different tints of the same color, which shall vary in thickness in such a way as to be thinner over certain areas or along certain lines. All, or all or part of, one or both surfaces is then subjected to a uniform disintegration process. The outer layer or layers are thus partially destroyed or eaten away and expose in varying degrees the tint or color of the underlying layer or layers, following generally the areas or lines of decreased thickness, while the designs thus produced will exhibit the desired soft and gradual blendings of color.

It has long been common to form glass articles in molds by a blowing operation, the glass that is blown consisting of two or more layers of glass of different kinds or colors; for the purpose one kind or color of glass is first gathered on the end of the blowing rod, then this is dipped into molten glass of another kind or color, forming a layer on the glass first gathered and then, if desired, still another layer of glass is added in a similar manner.

I have observed that, when molten glass of two or more layers is thus gathered and blown in a mold having depressed portions such as are employed in forming a design, the glass in being blown and in flowing into such depressed portions stretches somewhat, with the result that the glass, and especially the outer layer thereof, is thinner in those portions than in others, and is thinner in the more depressed portions than in those that are less depressed.

My invention is based upon the foregoing observations, and in the preferred form of my process layers of differently colored or tinted glass are blown into a mold in whose inner surface cavities or grooves are cut of greater or less depth and sharpness, forming designs. As the glass, especially the layer immediately in contact with the mold, is forced into these grooves and cavities, it is unevenly stretched or thinned out, the degree of such thinning depending upon the depth and sharpness of the grooves or cavities. On being placed in an acid bath or subjected to sand-blasting or any uniform disintegration process, the inner layers will be exposed, or will show through, to a greater less extent, corresponding to the thinness of the outer layers, thus producing the designs and gradual color blendings. I do not, however, confine myself to this specific method but claim generally the process which consists in constructing an article of two or more layers of differently colored glass, one or more of such layers varying in thickness at different parts of the surface, and then subjecting the article to any uniform disintegrating process.

In the production of similar "art glassware" it has hitherto been necessary to cover portions of the surface with a protective coating either by mechanical means, as by the so-called "decalcomania" process, or by hand-labor. On then subjecting the article to sand-blasting or acid-etching, the protected portions have retained the original texture and color of the outer layer of glass, while the unprotected portions show the color or tint of an inner layer. By my improved process, the glass article as it comes from the mold is at once placed in the acid bath, or exposed to sand-blasting, or any similar process, without any preliminary preparation of the surface, and the colors blend by soft and imperceptible gradations, producing artistic effects far superior to those hitherto obtained by the employment of the most expensive skilled labor.

My process is capable of many useful applications.

By my process, reflectors for artificial lights may be formed with an inner layer of opal or opaline translucent glass and with outer layers of different tints, and then the outer surface, or both the inner and outer surfaces, may be evenly acted upon by sand-blasting or acid-etching, thus producing an article with an inner white surface for reflecting light rays and an outer surface having raised designs embodying the most softly blending color or tints. Glass inclosures and glass articles can also be produced which have all the texture and color effects of ivory, metal or textile fabrics by using different layers of glass embodying the necessary combinations of colors for producing the appearance desired.

Colored reflectors for artificial lighting purposes are now made consisting of an inner layer of white opal glass covered with an outer layer of colored glass; these are generally blown into a smooth mold, though sometimes into a mold having radial flutes, but the article is invariably a two-layer glass article having an inner white opal glass layer and an outer colored layer of an even color over its entire surface. My improved process, applied to such reflectors, enables accurate and efficient reflectors to be made, the surface of which, when viewed by daylight or by artificial light, presents artistically tinted ornamental forms.

When very delicate color effects in glassware are desired, I prefer to place the colored layers on the inner part of the article, the outer layer being very thin and of opal glass. When subjected to the disintegrating process, the white outside is partially destroyed and the underlying layers appear more or less distinctly through the outer layer. The partially destroyed layers serves to tone the strong color contrast of the shade when viewed from the outside. This provides for those classes of reflectors where the outer layer would be of too marked a color even though the larger portion had been removed, as the effect of a white or neutrally tinted thin coating, especially when depolished, upon a deep tint renders the appearance of a reflector more artistic when not illumined by artificial light. A colored layer on the inner surface of a reflector would not act as a good reflecting medium and where I wish to produce reflectors having a subdued color effect when viewed by daylight and also a white reflecting inner surface, I provide them with an inner as well as an outer layer of opal glass.

In applying my process to the production of whitish reflectors, I generally prefer to make them with an inner lining of white glass and a thin outer lining of opal glass, which, when subjected to the disintegrating process mentioned, will result in producing reflectors having designs carried out in varying translucencies of white, giving the effect of mother-of-pearl. A different effect can be obtained by making the inner lining of white opal covered with a thin lining of transparent glass. When the transparent glass is partially removed and depolished by the disintegrating process, the result will be a design in contrasting tints of white. For making the highest grade of artistic glass I prefer to use three or more superimposed layers of different tints or colors of glass; the disintegrating process is then carried sufficiently far to affect all the layers but one. The designs appear in soft blendings of three or more colors and the article is given a richer and more artistic appearance by daylight and by artificial light than has hitherto been obtained by any of the hand processes.

If desired, the disintegrating process may be carried further on some portion of the article than on others, so as to still further vary the effects. But my process is such that no preparation of the surface, and no skilled artistic labor are necessary, as in the processes now in use.

I claim:—

1. The process of making glass inclosures which consists in forcing a plurality of layers of glass of different tints or colors into a mold having raised and depressed portions constituting a design and then subjecting the article to a uniformly applied acid bath to cause the tints or colors of the underlying layers of glass to be exposed through and softly blended with the partially destroyed exterior layers.

2. The process of making glass inclosures which consists in forcing a plurality of layers of glass of different tints or colors into a mold having raised and depressed portions constituting a design and then removing portions of the outer layers by a uniformly applied disintegration process.

3. The process of making ornamental glassware which consists in producing a glass body comprising at least two layers of different colors, the outer layer having thereon extensions and depressions constituting a design, and then applying a disintegration process uniformly over the entire surface of said outer layer to remove a portion of the same thus exposing in varying degree the underlying layer and producing a blending of the colors of the said layers.

OTIS A. MYGATT.

Witnesses:
B. J. CURRAN,
NORMAN HERBERT SMITH.